(12) United States Patent
Chen

(10) Patent No.: US 7,440,276 B1
(45) Date of Patent: Oct. 21, 2008

(54) COOLING-FAN-FREE SYSTEM MODULE

(75) Inventor: Mao-Chiang Chen, Taipei Hsien (TW)

(73) Assignee: Posiflex Inc., Taipei Hsien (TW)

( * ) Notice: Subject to any disclaimer, the term of this patent is extended or adjusted under 35 U.S.C. 154(b) by 0 days.

(21) Appl. No.: 11/764,807

(22) Filed: Jun. 19, 2007

(30) Foreign Application Priority Data

Apr. 20, 2007 (TW) .............................. 96206389 U

(51) Int. Cl.
  *H05K 7/20* (2006.01)
  *F28F 7/00* (2006.01)
  *H01L 23/34* (2006.01)
(52) U.S. Cl. ...................... 361/690; 165/80.3; 165/185; 361/704; 361/719; 257/719
(58) Field of Classification Search ................. 361/690, 361/719
  See application file for complete search history.

(56) References Cited

U.S. PATENT DOCUMENTS

| | | | | |
|---|---|---|---|---|
| 4,980,848 A | * | 12/1990 | Griffin et al. ................. | 361/687 |
| 5,546,275 A | * | 8/1996 | Moutrie et al. ............... | 361/707 |
| 6,043,979 A | * | 3/2000 | Shim ........................... | 361/695 |
| 6,101,095 A | * | 8/2000 | Yamaguchi ................... | 361/720 |
| 6,549,410 B1 | * | 4/2003 | Cohen ......................... | 361/704 |
| 6,665,188 B1 | * | 12/2003 | Chen ........................... | 361/719 |
| 6,831,833 B2 | * | 12/2004 | Kim et al. .................... | 361/690 |
| 7,031,165 B2 | * | 4/2006 | Itabashi et al. .............. | 361/719 |
| 7,042,727 B2 | * | 5/2006 | Ulen et al. ................... | 361/704 |
| 7,209,354 B2 | * | 4/2007 | Wu et al. ..................... | 361/697 |
| 7,352,585 B2 | * | 4/2008 | Mandel et al. ............... | 361/714 |
| 2002/0186540 A1 | * | 12/2002 | Rodriguez et al. .......... | 361/719 |
| 2005/0068741 A1 | * | 3/2005 | Bailey et al. ................. | 361/719 |

\* cited by examiner

*Primary Examiner*—Gregory D Thompson
(74) *Attorney, Agent, or Firm*—Pai Patent & Trademark Law Firm; Chao-Chang David Pai

(57) ABSTRACT

A cooling-fan-free system module includes a housing unit having a front and a rear case together defining a receiving space therebetween, and the rear case being highly thermal-conductive; a circuit module received in the receiving space of the housing unit and including a circuit board having at least one heat-producing element electrically connected thereto; a heat radiating unit including a heat-conducting pad raised from an inner side of the rear case corresponding to the heat-producing element for transferring heat produced by the heat-producing element to the rear case, and at least one fin-like heat radiating member integrally formed on a back side of the rear case; and a tightening unit including at least two sets of internally threaded posts, screw fasteners, and elastic elements to ensure tight and good contact of the heat-conducting pad with the heat-producing element.

28 Claims, 6 Drawing Sheets

COOLING-FAN-FREE SYSTEM MODULE

RELATED APPLICATIONS

This application claims priority to Taiwan Application Serial Number 96206389, filed Apr. 20, 2007, which is herein incorporated by reference.

FIELD OF THE INVENTION

The present invention relates to a cooling-fan-free system module, and more particularly to a system module provided with heat radiating unit and employing thermal convection and thermal transmission to achieve good heat radiating effect.

BACKGROUND OF THE INVENTION

The currently available system module usually includes a housing and a circuit module provided in the housing. The circuit module consists of a main board, and a plurality of electronic elements mounted on the main board, such as a central processing unit (CPU), a hard disk, a memory, and integrated circuits (IC's).

Since the electronic elements produce heat during operation thereof, vents and cooling fans are normally provided on the system module at proper positions corresponding to the heat-producing electronic elements to prevent the electronic elements from overheated to result in failure or abnormal operation of the system module.

Following disadvantages are found in the conventional system module which uses the cooling fan to carry away heat produced by the electronic elements during operation thereof:
(1) The cooling fan requires high manufacturing cost.
(2) The cooling fan occupies a large space to adversely affect good utilization of an inner space of the system module.
(3) The cooling fan tends to produce noise during operation thereof.
(4) The cooling fan tends to become failed after having been used over a long time.

SUMMARY OF THE INVENTION

It is therefore a primary object of the present invention to provide a cooling-fan-free system module that has lowered manufacturing cost and allows good applicability.

Another object of the present invention is to provide a cooling-fan-free system module that allows good utilization of an inner space thereof.

A further object of the present invention is to provide a cooling-fan-free system module that includes a noise-free and failure-free heat radiating unit.

To achieve the above and other objects, the cooling-fan-free system module according to the present invention includes a housing unit, a circuit module, a heat radiating unit, and a tightening unit. The housing unit includes a front and a rear case assembled together to define a receiving space therebetween, and the rear case is made of a highly heat conducting metal material. The circuit module is received in the receiving space of the housing unit, and includes a circuit board, and at least one heat-producing element mounted and electrically connected to the circuit board. Two opposite sides of the rear case facing toward and facing away from the heat-producing element are defined as an inner and a back side of the rear case, respectively. The heat radiating unit includes a heat-conducting pad and at least one heat radiating member. The heat-conducting pad is arranged on and raised from the inner side of the rear case at a position corresponding to the heat-producing element for transferring the heat produced by the heat-producing element to the rear case. The at least one heat radiating member is integrally formed on a back side of the rear case and in the form of a radiating fin. The tightening unit includes at least two internally threaded posts, at least two screw fasteners, and at least two elastic elements. The internally threaded posts are provided on the inner side of the rear case at two opposite sides of the heat-conducting pad. Each of the internally threaded posts includes two integrally formed portions, namely, a base portion projected from the inner side of the rear case, and a hollow sleeve portion adapted to extend through the circuit board to a front side thereof. The two screw fasteners are separately screwed into the two hollow sleeve portions. The two elastic elements are separately put around the two hollow sleeve portions to locate between the screw fasteners and the circuit board.

The rear case is provided at a rear lower edge and a rear upper edge with a first and a second cutaway portion, respectively, to communicate the receiving space with an outer side of the housing unit. And, the circuit module further includes at least one signal transmission element mounted on and electrically connected to the circuit board, and at least one bracket assembled to an inner lower side of the housing unit. The bracket is provided with at least one opening corresponding to the at least one signal transmission element, and at least one aperture communicating with the first and the second cutaway portion.

The second cutaway portion consists of a row of densely spaced vents.

The at least one heat-producing element is selected from the group consisting of a CPU, a hard disk, a memory, and an IC.

The rear case includes a first cover that is assembled to the front case and has a third cutaway portion, and a second cover that is detachably connected to and openably closes the third cutaway portion of the first cover.

The first cover further includes at least one locating mortise formed at an inner lateral edge of the third cutaway portion, and the second cover further includes at least one locating tenon corresponding to and adapted to engage with the locating mortise.

The heat-conducting pad may be integrally formed on the inner side of the rear case, or a separately formed pad.

The heat-radiating unit may further include a heat-conducting medium arranged between the heat-producing element and the heat-conducting pad, as well as between the heat-conducting pad and the rear case.

The heat-conducting medium may be a flexible insulating heat-conducting member, or a type of thermal-conductive compound.

The rear case is also provided near lateral upper and lower positions with a plurality of air outlets and air inlets, respectively.

The system module of the present invention includes a display module; and both of the system module and the display module are mounted on a base.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
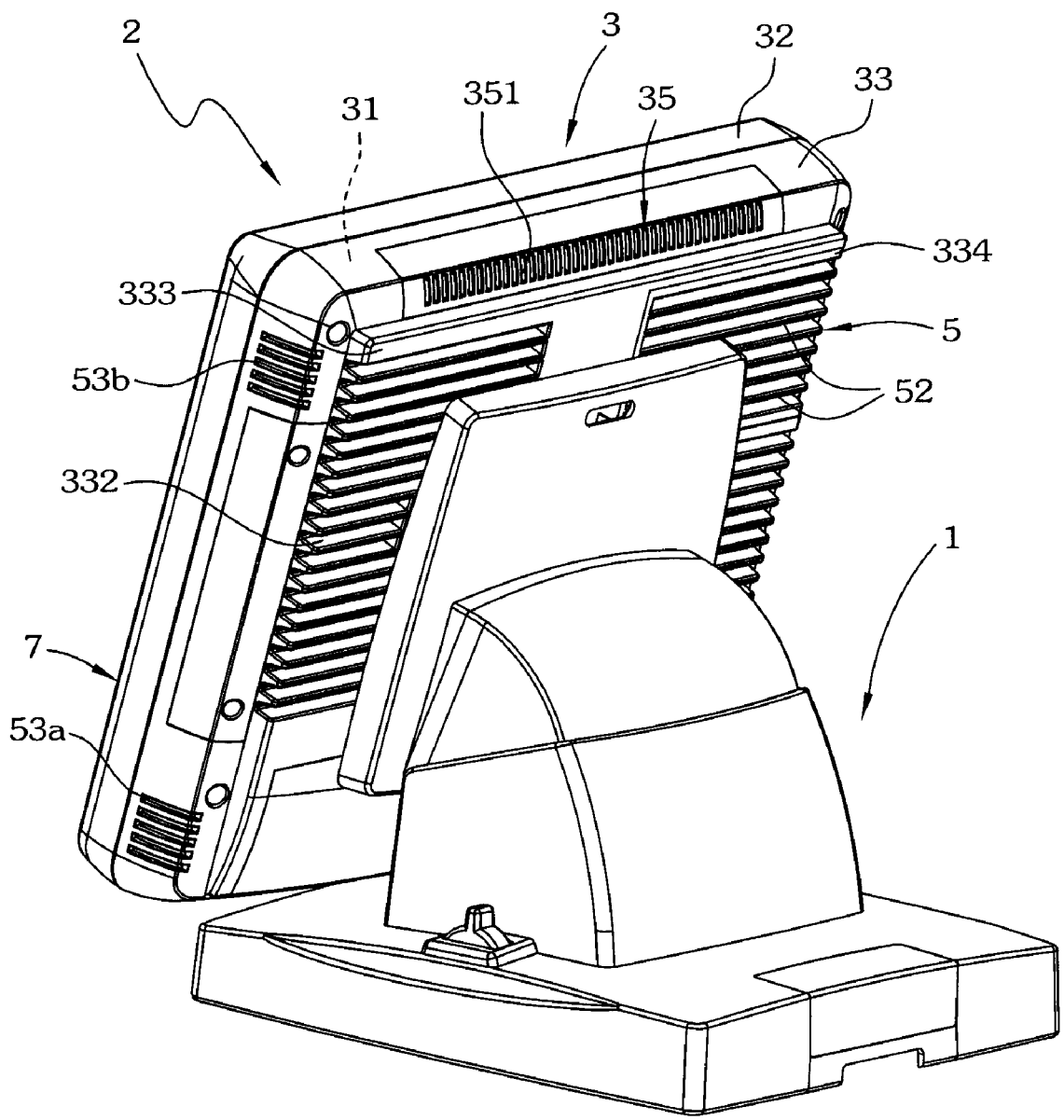
FIG. 1 is an assembled rear perspective view of a cooling-fan-free system module according to a preferred embodiment of the present invention mounted on a base.
Figure 2:
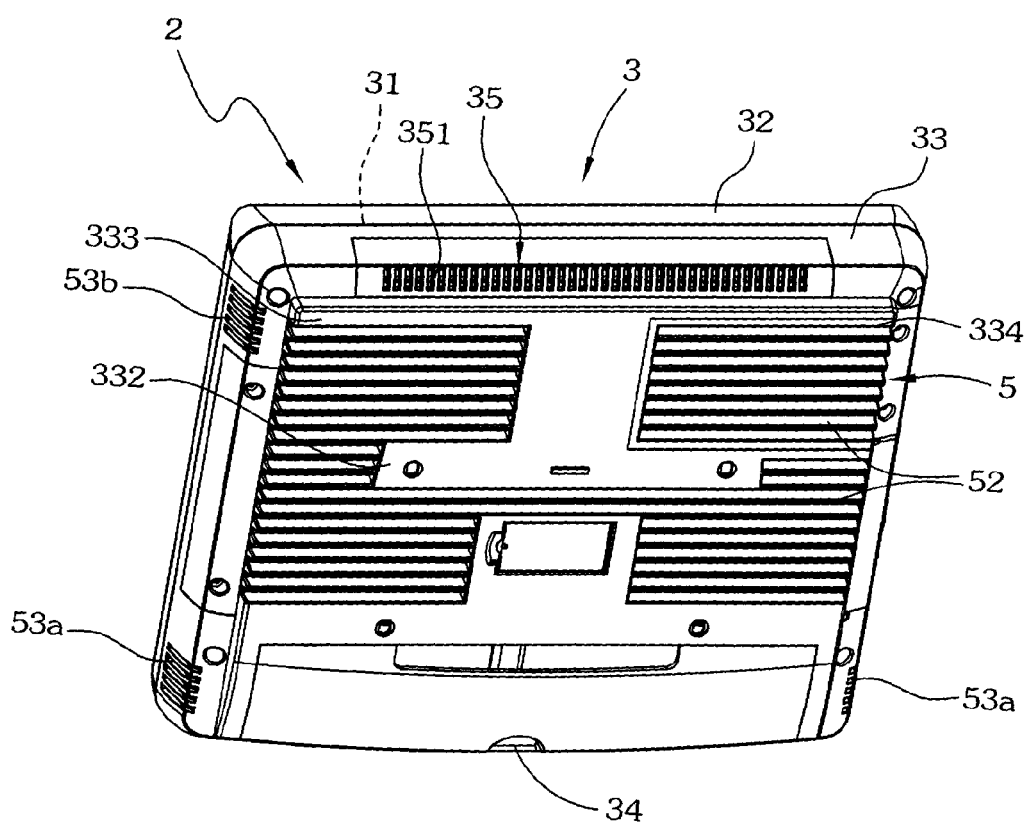
FIG. 2 is an assembled rear perspective view of the system module according to the preferred embodiment of the present invention.
Figure 3:
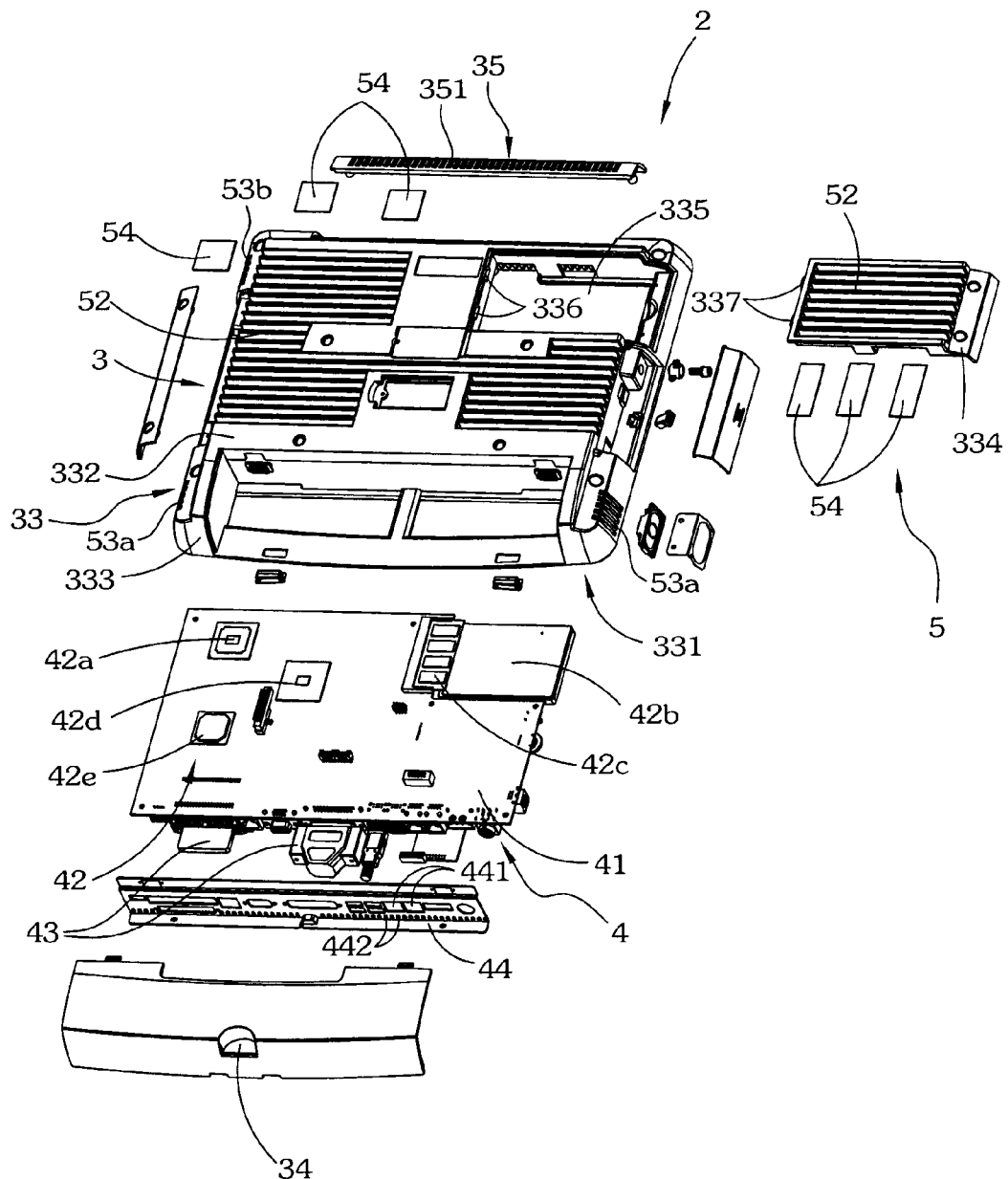
FIG. 3 is an exploded rear perspective view showing a housing unit, a circuit module, and a heat radiating unit of the system module of the present invention.
Figure 4:
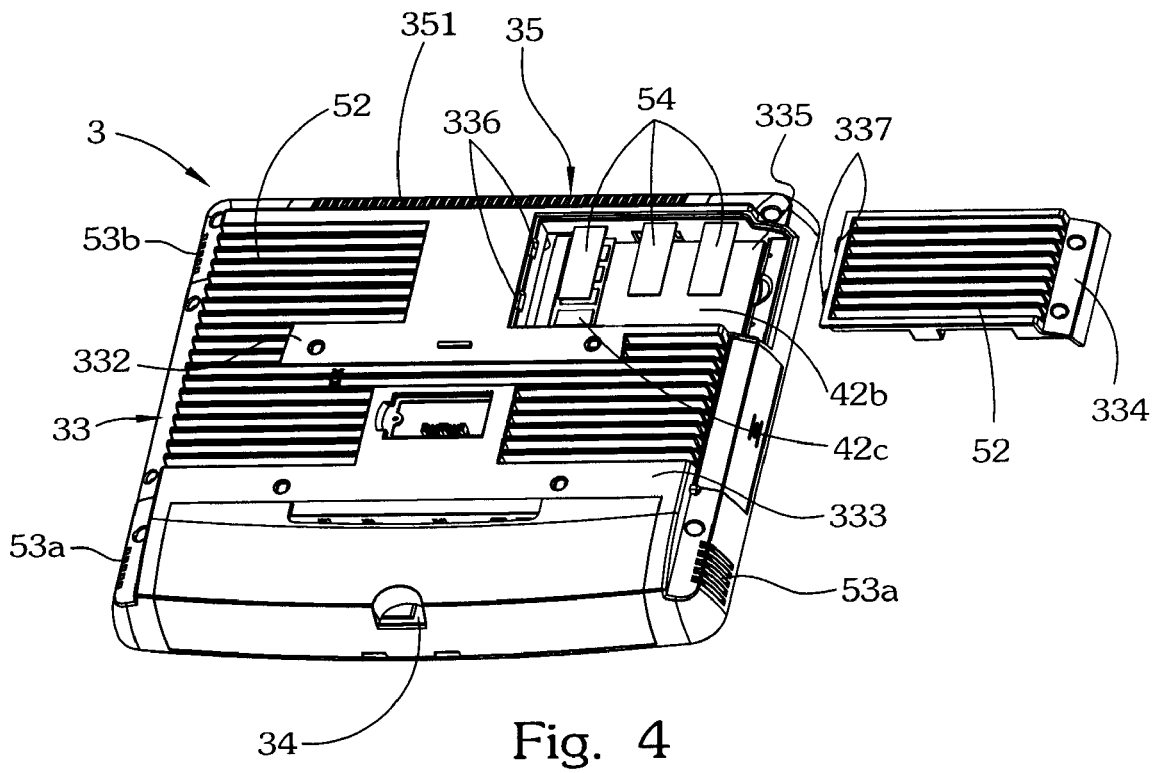
FIG. 4 is a rear perspective view of the system module of FIG. 2 with a second cover removed from a first cover thereof.
Figure 5:
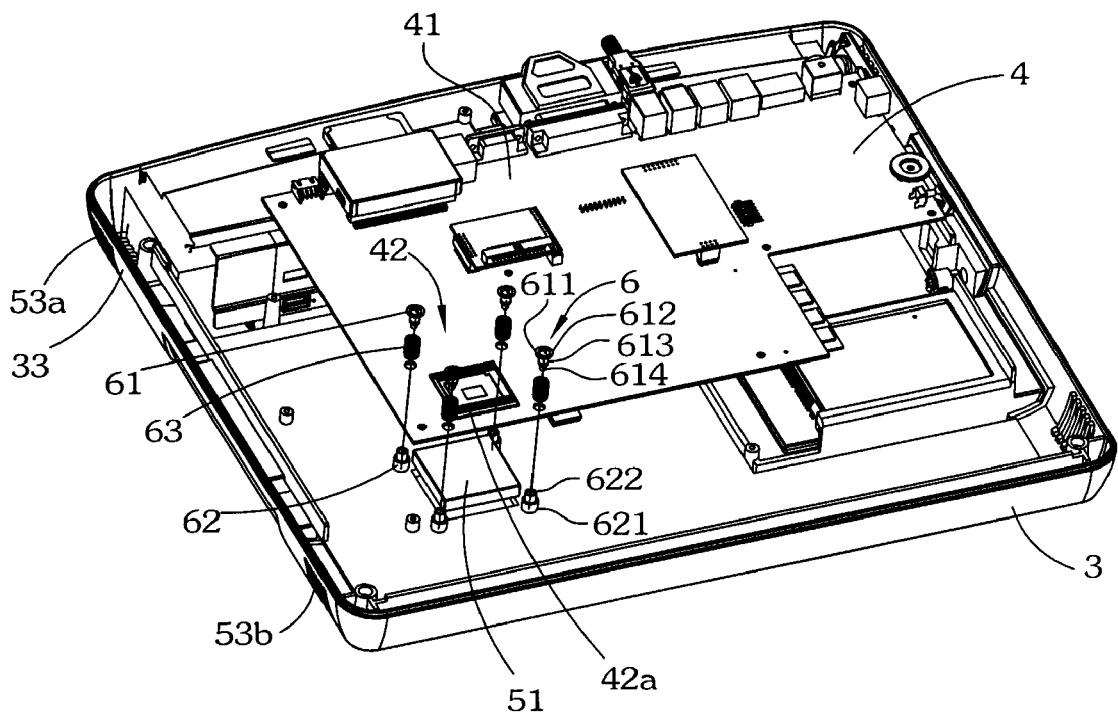
FIG. 5 is an exploded front perspective view showing a heat-conducting pad and a compressing unit provided in the system module according to the present invention.

Please refer to FIG. 1 that is a rear perspective view of a cooling-fan-free system module 2 according to a preferred embodiment of the present invention mounted on a base 1, and to FIGS. 2 and 3 that are assembled and exploded rear perspective views, respectively, of the system module 2. As shown, the system module 2 includes a housing unit 3, a circuit module 4, a heat radiating unit 5, and a tightening unit 6.

The housing unit 3 includes a front case 32 and a rear case 33, which are assembled together to define an internal receiving space 31 therebetween. The rear case 33 is made of a highly heat conducting metal material, such as aluminum, copper, or alloys thereof.

Please refer to FIGS. 2 to 5 at the same time. The circuit module 4 is located in the receiving space 31 defined by the housing unit 3, and includes a circuit board 41, and at least one heat-producing element 42 mounted on and electrically connected to one side of the circuit board 41 facing toward the rear case 33. The circuit module 4 further includes at least one signal transmission element 43 (see FIG. 3) mounted on and electrically connected to the circuit board 41, and a bracket 44 assembled to a lower inner side of the rear case 33 of the housing unit 3, such that the at least one signal transmission element 43 is outward extended from the circuit board 41 through the bracket 44 to be held in place. Herein, one side of the rear case 33 facing toward the at least one heat-producing element 42 is defined as an inner side 331 of the rear case 33, and another side of the rear case 33 facing away from the at least one heat-producing element 42 is defined as a back side 332 of the rear case 33. In the illustrated preferred embodiment of the present invention, there are five heat-producing elements 42 provided on the circuit board 41, namely, a central processing unit (CPU) 42a, a hard disk 42b, a memory 42c, and two integrated circuits (IC's) 42d, 42e.

The bracket 44 is provided with at least one opening 441 to communicate spaces above and below the bracket 44. An exact number and shape of the opening 441 is correspondent to that of the signal transmission element 43, so that the signal transmission element 43 may be outward extended from the circuit board 41 through the corresponding opening 441 and firmly held thereto. In the illustrated preferred embodiment of the present invention, the at least one signal transmission element 43 may be a universal serial bus (USB), an audio/video (AV) terminal, or a PS2 port. The bracket 44 is further provided with a plurality of apertures 442 communicating spaces above and below the bracket 44.

In the illustrated preferred embodiment of the present invention, the hard disk 42b and the memory 42c are removably connected to the circuit board 41 to enable convenient and easy replacement thereof. And, the rear case 33 is divided into a first cover 333, which is assembled to the front case 32 and having a third cutaway portion 335 at a position corresponding to the hard disk 42b and the memory 42c; and a second cover 334, which is detachably connected to the first cover 333 at the third cutaway portion 335 to openably close the latter. The third cutaway portion 335 is further provided at a lateral inner edge with at least one locating mortise 336, and the second cover 334 is further provided with at least one locating tenon 337 corresponding to the at least one locating notch 336, so that the second cover 334 is removable connected to the first cover 333 to openably close the third cutaway portion 335 and form a complete rear case 33 via engagement of the at least one locating tenon 337 with the at least one locating mortise 336. When it is desired to remove the hard disk 42b or the memory 42c from the circuit board 41, simply disengage the locating tenon 337 of the second cover 334 from the locating mortise 336 of the first cover 333.

In the present invention, heat produced by the heat-producing elements 42 during operation thereof is carried away from the cooling-fan-free system module 2 by employing two different ways, namely, by thermal convection and heat transmission.

To carry away heat through thermal convection, the first cover 333 of the rear case 33 is formed at a rear lower edge with a first cutaway portion 34, at a rear upper edge with a second cutaway portion 35, and near lateral upper and lower positions with a plurality of air outlets 53b and air inlets 53a, respectively. Both the first and the second cutaway portion 34, 35 are communicable with the apertures 442 on the bracket 44. In the illustrated preferred embodiment of the present invention, the second cutaway portion 35 consists of a row of spaced vents 351 formed at a top of the first cover 333. When the heat-producing elements 42 operate and produce heat, they exchange heat with ambient cold air. Hot air in the receiving space 31 of the system module 2 moves upward and is released from the second cutaway portion 35 at the rear upper edge of the rear case 33 and the air outlets 53b at the lateral upper positions of the first cover 333, and cold air moves into the receiving space 31 via the first cutaway portion 34 at the rear lower edge of the rear case 33, the air inlets 53a at the lateral lower positions of the first cover 333, and the apertures 442 on the bracket 44 to replenish the air in the receiving space 31, and to further exchange heat with the heat-producing elements 42. When the thermal convection continues, heat produced by the heat-producing elements 42 may be effectively carried away from the system module 2.

To carry away heat through heat transmission, the heat radiating unit 5 is utilized. Moreover, a tightening unit 6 is provided to help in maintaining good heat radiating performance of the heat radiating unit 5. The heat radiating unit 5 includes at least one heat-conducting pad 51 and a plurality of heat radiating members 52. The heat-conducting pad 51 is provided on and raised from the inner side 331 of the rear case corresponding to the at least one heat-producing element 42, such as the CPU, so as to transfer heat produced by the heat-producing element 42 to the rear case 33. The heat radiating members 52 are in the form of radiating fins, and are integrally formed at the back side 332 of the first cover 333 and the second cover 334 of the rear case 33, that is, at the side of the rear case 33 facing away from the circuit module 4. Heat absorbed by the rear case 33 is dissipated into air via the heat radiating members 52.

In the illustrated preferred embodiment of the present invention, the tightening unit 6 includes four screw fasteners 61, four internally threaded posts 62, and four elastic elements 63. Each of the screw fasteners 61 includes a screw 611 and a snap ring 612. The screw 611 has a head portion 613 and a shank portion 614 connected to each other. The snap ring 612 is fitted around the head portion 613 of the screw 611.

The internally threaded posts 62 are integrally formed on and perpendicularly projected from the inner side 331 of the rear case 33 to space from one another and locate in the vicinity of the heat-producing element 42 (42a) at two opposite sides of the heat-conducting pad 51. Each of the internally threaded posts 62 includes a base portion 621 integrally formed on the inner side 331 of the rear case 33, and a hollow sleeve portion 622 forward extended from the base portion 621. The sleeve portions 622 are adapted to extend through the circuit board 41 to receive and mesh with the shank portion 614 of the screw 611. With these arrangements, the screw fastener 61, the internally threaded post 62, and the elastic element 63 fitted around the screw fastener 61 together tighten the circuit board 41 to the rear case 33, and accordingly compress the CPU 42a against the heat-conducting pad 51. It is noted the hollow threaded posts 62 have a height smaller than that of other internally threaded posts used to assemble the rear case 33 to the front case 32, so as to enable successful connection of the front case 32 to the rear case 33.

The elastic elements 63 are configured as compression springs for fitting around the sleeve portions 622 while being limited between the circuit board 41 and the snap ring 612. When the elastic elements 63 are compressed, they provide a buffering effect to protect the circuit board 41 against damage possibly caused by an excessively tight fastening of the screw fasteners 61 into the threaded posts 62. Meanwhile, due to a spring force thereof, the compressed elastic elements 63 tightly push the heat-producing element 42 (42a) against the heat-conducting pad 51 to ensure good contact therebetween.

With the heat radiating unit 5 and the tightening unit 6, the heat produced by the heat-producing element 42 (42a) during the operation thereof may be directly and quickly transferred via the heat-conducting pad 51 to the rear case 33 and the heat radiating members 52 to finally dissipate into the ambient air. Therefore, the heat radiating unit 5 and the tightening unit 6 together effectively protect the heat-producing element 42 from failure caused by overheating.

In the illustrated embodiment, the screws 611 and the elastic elements 63 are of general specifications, and the heads 613 of the screws 611 have a cross section smaller than that of the elastic elements 63. To allow the elastic elements 63 to stably locate between the heat-producing element 42 (42a) and the heat-conducting pad 51, the snap ring 612 is fitted around the head 613 of the screw 611. However, it is also acceptable to direct select screws having a cross section larger than that of the elastic elements 63. Moreover, in the illustrated embodiment, the threaded posts 62, the screw fasteners 61, and the elastic elements 63 are separately in the number of four. However, the numbers of the threaded posts 62, the screw fasteners 61, and the elastic elements 63 may be adjusted according to actual needs.

Figure 6:
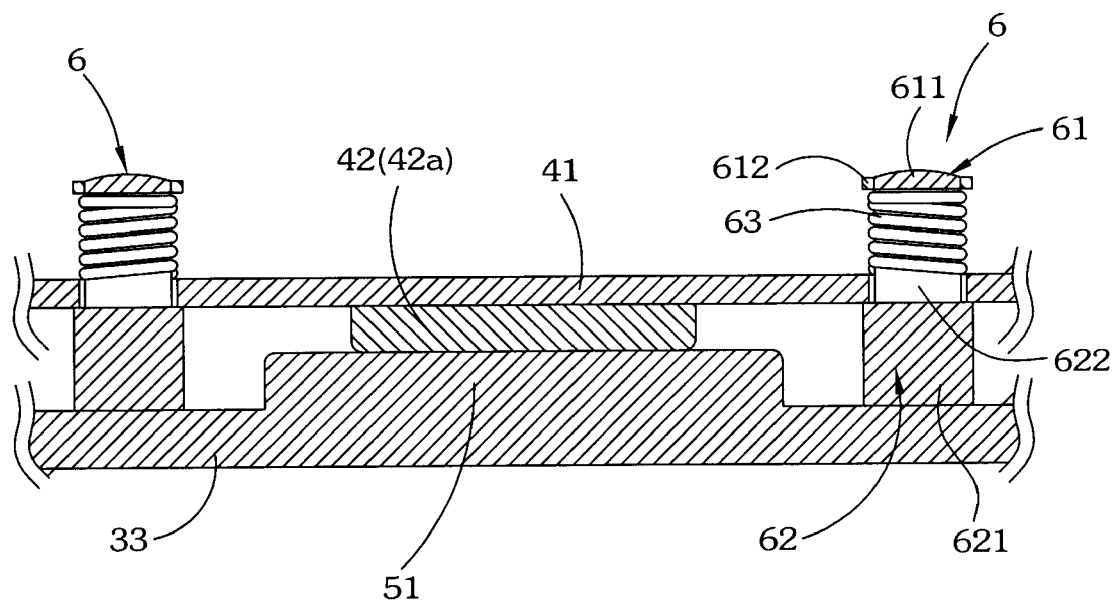
FIG. 6 is a sectioned side view showing the positional relation between the heat-conducting pad and a central processing unit in the system module of the present invention.
Figure 7:
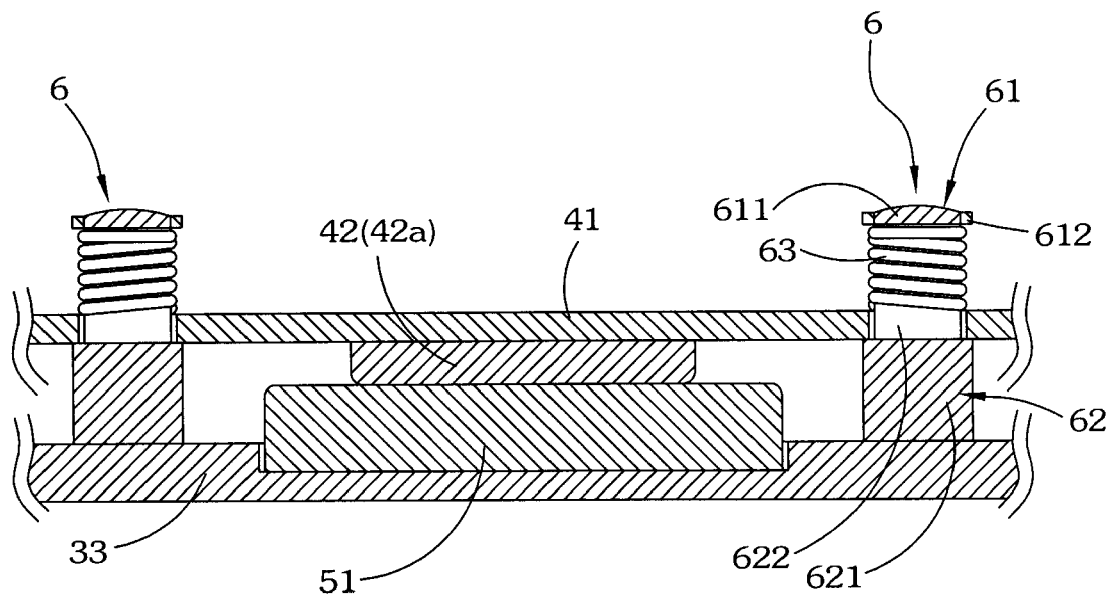
FIG. 7 is a sectioned side view showing another embodiment of the heat-conducting pad in the system module of the present invention.

Please refer to FIG. 6. In implementing the present invention, the heat-conducting pad 51 may be integrally formed on the inner side 331 of the rear case 33. However, the heat-conducting pad 51 may be otherwise separately formed and then assembled to the inner side 331 of the rear case 33 to become raised therefrom, as shown in FIG. 7. The heat-conducting pad 51 may have a size and thickness determined according to the amount of heat produced by the heat-producing elements 42. In the structure as shown in FIG. 7, the heat-conducting pad 51 may be made of a material with even higher thermal conductivity, so that the heat produced by the heat-producing elements 42 may be more quickly transferred via the heat-conducting pad 51 to the rear case 33 and dissipated into air to achieve upgraded heat radiation efficiency.

Figure 8:
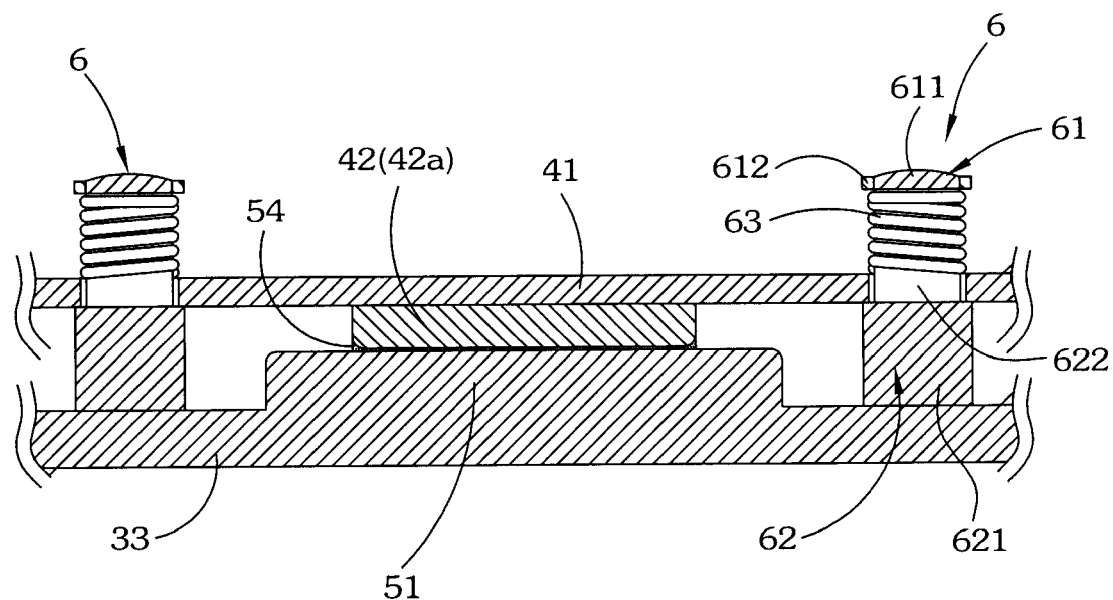
FIG. 8 is a sectioned side view showing a further embodiment of the heat-conducting pad in the systemodule of the present invention.
Figure 9:
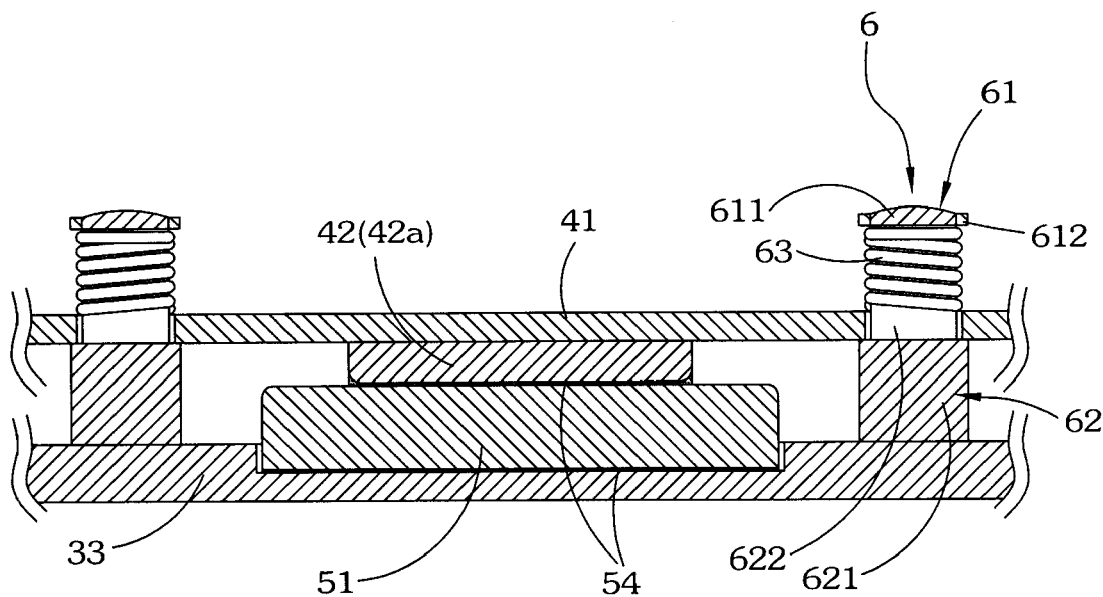
FIG. 9 is a sectioned side view showing a still further embodiment of the heat-conducting pad in the systemodule of the present invention.

Please refer to FIGS. 8 and 9. The heat radiating unit 5 further includes a heat-conducting medium 54 arranged between the heat-producing element 42 (42a) and the heat-conducting pad 51, and/or between the heat-conducting pad 51 and the rear case 33. The heat-conducting medium 54 may be a flexible insulating heat-conducting member, or a type of thermal-conductive compound. The heat-conducting medium 54 enables an improved bonding of the heat-conducting pad 51 to and between the rear case 33 and the heat-producing elements 42, and accordingly, upgraded heat radiating efficiency.

As can be seen from FIG. 1, the system module 2 further includes a display module 7, and both of the system module 2 and the display module 7 are mounted on the base 1 for a user to conveniently watch the display module 7.

With the above arrangements, the cooling-fan-free system module of the present invention does not require any additional heat radiating device mounted thereto. In stead, the present invention utilizes the convection mechanism consisting of the first cutaway portion 34, the apertures 442, and the second cutaway portion 35; the fin-like heat radiating members 52 integrally formed on the back side 332 of the rear case 33; the heat-conducting pad 51 transferring heat produced by the heat-producing elements 42; and the tightening unit 6 and the heat-conducting medium 54 enhancing tight contact between the heat-conducting pad 51 and the heat-producing element 42 to achieve a highly efficient heat radiating effect at reduced cost, without producing any noise, and free of mechanical failure. Moreover, the components 51, 52, 53a, 53b, and 54 of the heat-radiating unit 5 occupy only a very small space, allowing a user to effectively utilize the receiving space 31 in the housing unit 3.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A cooling-fan-free system module, comprising:
a housing unit including a front case and a rear case assembled together to define a receiving space therebetween, and said rear case being made of a highly heat conducting metal material;
a circuit module being received in said receiving space, and including a circuit board, and at least one heat-producing element mounted on and electrically connected to one side of said circuit board facing toward said rear case; and two sides of said rear case facing toward and facing away from said at least one heat-producing element being defined as an inner side and a back side, respectively, of said rear case; and a heat radiating unit including a heat-conducting pad arranged on and raised from the inner side of said rear case corresponding to said at least one heat-producing element, so as to transfer heat produced by said at least one heat-producing element to said rear case, and at least one heat radiating member integrally formed on said back side of said rear case and in the form of radiating fins; and a tightening unit including at least two internally threaded posts, at least two screw fasteners, and at least two elastic elements;

each of said internally threaded posts being provided on said inner side of said rear case and located at two opposite sides of said heat-conducting pad; and integrally including a base portion perpendicularly projected from said inner side of said rear case, and a hollow sleeve portion adapted to extend through said circuit board to a front side thereof;

said screw fasteners being separately screwed into said hollow sleeve portions; respectively, and said elastic elements being separately fitted around said hollow sleeve portions, respectively, to be located between said screw fasteners and said circuit board.

2. The cooling-fan-free system module as claimed in claim 1, wherein said rear case is provided at a rear lower edge and a rear upper edge with a first and a second cutaway portion, respectively, to communicate with said receiving space of said housing unit; and wherein said circuit module further includes at least one signal transmission element mounted on and electrically connected to said circuit board, and at least one bracket assembled to a lower inner side of said housing unit; said bracket being provided with at least one opening corresponding to said at least one signal transmission element, and at least one aperture communicating with said first and said second cutaway portion.

3. The cooling-fan-free system module as claimed in claim 2, wherein said second cutaway portion consists of a row of spaced vents formed at a top of the rear case.

4. The cooling-fan-free system module as claimed in claim 1, wherein said at least one heat-producing element is selected from the group consisting of a CPU, a hard disk, a memory, and an IC.

5. The cooling-fan-free system module as claimed in claim 1, wherein said rear case includes a first cover that is assembled to said front case and has a third cutaway portion, and a second cover that is detachably connected to and openably closed onto said third cutaway portion of said first cover.

6. The cooling-fan-free system module as claimed in claim 2, wherein said rear case includes a first cover that is assembled to said front case and has a third cutaway portion, and a second cover that is detachably connected to and openably closed onto said third cutaway portion of said first cover.

7. The cooling-fan-free system module as claimed in claim 5, wherein said first cover further includes at least one locating mortise formed at an inner lateral edge of said third cutaway portion, and said second cover further includes at least one locating tenon correspondingly to and adapted to engage with said at least one locating mortise.

8. The cooling-fan-free system module as claimed in claim 6, wherein said first cover further includes at least one locating mortise formed at an inner lateral edge of said third cutaway portion, and said second cover further includes at least one locating tenon correspondingly to and adapted to engage with said at least one locating mortise.

9. The cooling-fan-free system module as claimed in claim 1, wherein said heat-conducting pad is integrally formed on said inner side of said rear case.

10. The cooling-fan-free system module as claimed in claim 2, wherein said heat-conducting pad is integrally formed on said inner side of said rear case.

11. The cooling-fan-free system module as claimed in claim 9, wherein said heat radiating unit further includes a heat-conducting medium arranged between said heat-producing element and said heat-conducting pad.

12. The cooling-fan-free system module as claimed in claim 10, wherein said heat radiating unit further includes a heat-conducting medium arranged between said heat-producing element and said heat-conducting pad.

13. The cooling-fan-free system module as claimed in claim 11, wherein said heat-conducting medium is a flexible insulating heat-conducting member.

14. The cooling-fan-free system module as claimed in claim 12, wherein said heat-conducting medium is a flexible insulating heat-conducting member.

15. The cooling-fan-free system module as claimed in claim 11, wherein said heat-conducting medium is a type of thermal-conductive compound.

16. The cooling-fan-free system module as claimed in claim 12, wherein said heat-conducting medium is a type of thermal-conductive compound.

17. The cooling-fan-free system module as claimed in claim 1, wherein said heat-conducting pad and said rear case are separately produced.

18. The cooling-fan-free system module as claimed in claim 2, wherein said heat-conducting pad and said rear case are separately produced.

19. The cooling-fan-free system module as claimed in claim 17, wherein said heat-radiating unit further includes two heat-conducting media, one of said two heat-conducting media being arranged between said heat-producing element and said heat-conducting pad, and the other one of said two heat-conducting media being arranged between said rear case and said heat-conducting pad.

20. The cooling-fan-free system module as claimed in claim 18, wherein said heat-radiating unit further includes two heat-conducting media, one of said two heat-conducting media being arranged between said heat-producing element and said heat-conducting pad, and the other one of said two heat-conducting media being arranged between said rear case and said heat-conducting pad.

21. The cooling-fan-free system module as claimed in claim 19, wherein said heat-conducting media are flexible insulating heat-conducting members.

22. The cooling-fan-free system module as claimed in claim 20, wherein said heat-conducting media are flexible insulating heat-conducting members.

23. The cooling-fan-free system module as claimed in claim 19, wherein said heat-conducting media are a type of thermal-conductive compound.

24. The cooling-fan-free system module as claimed in claim 20, wherein said heat-conducting media are a type of thermal-conductive compound.

25. The cooling-fan-free system module as claimed in claim 1, wherein said rear case is provided near lateral upper and lower positions with a plurality of air outlets and air inlets, respectively.

26. The cooling-fan-free system module as claimed in claim 2, wherein said rear case is provided near lateral upper and lower positions with a plurality of air outlets and air inlets, respectively.

27. The cooling-fan-free system module as claimed in claim 1, further comprising a display module; and both of said system module and said display module being mounted on a base.

28. The cooling-fan-free system module as claimed in claim 2, further comprising a display module; and both of said system module and said display module being mounted on a base.

* * * * *